United States Patent [19]

Maillat

[11] Patent Number: 4,937,010
[45] Date of Patent: Jun. 26, 1990

[54] PAINT WITH SUSPENDED OIL INCLUSIONS; PREPARATION AND APPLICATIONS PROCESSES

[75] Inventor: Michel Maillat, Neuchatel, Switzerland

[73] Assignee: Laboratoire Suisse de Recherches Horlogeres, Switzerland

[21] Appl. No.: 251,074

[22] Filed: Sep. 28, 1988

Related U.S. Application Data

[63] Continuation of Ser. No. 85,263, Aug. 12, 1987, abandoned, which is a continuation of Ser. No. 831,128, Feb. 21, 1986, abandoned, which is a continuation of Ser. No. 631,102, Jul. 16, 1984, abandoned.

[30] Foreign Application Priority Data

Jul. 15, 1983 [CH] Switzerland ............... 3885/83

[51] Int. Cl.$^5$ ............... C10M 103/00; C10M 113/00
[52] U.S. Cl. ............................ 252/27; 252/28; 252/29; 524/474; 524/476
[58] Field of Search ............... 252/27, 28, 29; 524/474, 476

[56] References Cited

FOREIGN PATENT DOCUMENTS

| 2722582 | 12/1977 | Fed. Rep. of Germany . |
| 2469437 | 5/1981 | France . |
| 53-147737 | 12/1978 | Japan . |
| 54-112939 | 9/1979 | Japan . |
| 56-70880 | 6/1981 | Japan . |
| 56-84952 | 7/1981 | Japan . |

OTHER PUBLICATIONS

Dow Corning International Ltd., "Silikon-Kunststoff-Additive Von Dow Corning", 1976, 12 page brochure.

Primary Examiner—Theodore Morris
Attorney, Agent, or Firm—Parkhurst, Oliff & Berridge

[57] ABSTRACT

A product and method of suspending a substantially non-dissolved liquid lubricant or mixture of liquid lubricants within a non-metallic binder, which after application upon a desired surface and subsequent curing, provides a lubricating paint, which maintains the lubricant in a suspended state until the binder matrix is worn down by frictional contact with another surface, whereby the reached suspended lubricant inclusions are ruptured and spread over the surface of the binder matrix and providing lubrication between two parts in frictional contact with each other.

6 Claims, 7 Drawing Sheets $\emptyset = 0.11$ mm
$F = 4.5 \cdot 10^{-4}$ N

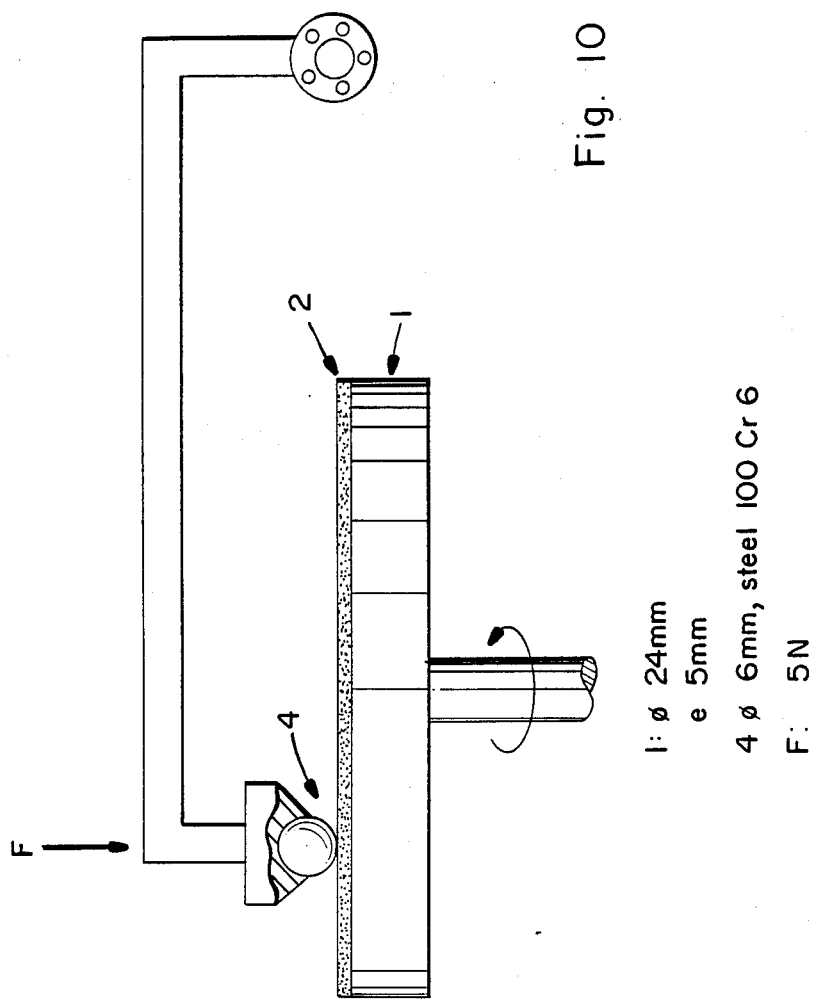

PAINT WITH SUSPENDED OIL INCLUSIONS; PREPARATION AND APPLICATIONS PROCESSES

This is a continuation of application Ser. No. 07/085,263 filed Aug. 12, 1987 which in turn is a Continuation of Ser. No. 831,128 filed 2/21/86 which is a continuation of Ser. No. 631,102, filed 7/16/84 now abandoned.

The present invention relates to the combination of paints with various suitable lubricants to realize coatings used to facilitate the sliding between mechanical parts, and more particularly, to a suspension of liquid lubricants within the paint.

Lubrication by fluids, such as oil or grease, is well known in the art. Lubricating fluids are utilized to give extended life to mechanical parts that are in contact with each other and subjected to some type of sliding engagement with each other. Lubricants therefore prevent seizures between mechanical parts, material transfer between mechanical parts, adhesion of parts of each other, and abrasion due to surface profiles, by maintaining a low and rather small coefficient of friction between the parts, resulting in a minimal loss of energy and a minimal loss of materials.

Lubricating fluids are particularly well suited for lubrication purposes because they are able to regenerate themselves even after shearing solicitations. Solids lubricants are partially analogous to fluid lubricants. Solid lubricants generally have a low adhesion to metals and are easily sheared in a manner parallel to the surface to which they are applied. However, the regeneration in solid lubricants is less complete as the regeneration in fluid lubricants. Solid lubricants are typically used where lubrication by fluids creates a problem of holding the fluids in place, or a risk of degradation, or evaporation e.g. in vacuum, and/or high temperature applications.

Solids lubricants can be deposited directly on surfaces, but this requires expensive technology with the resulting coating being very thin, otherwise, brittle coatings are formed.

Dry film lubricants have been suggested because they are less expensive to manufacture and can be of sufficient thickness to insure a sufficient quantity of solid lubricant. Dry film lubricants appeared a short time after the first solid lubricants.

Dry film lubricants comprise a binder, which assures adhesion to the substrate, and one or several types of solid lubricants which result in a low coefficient of friction between sliding surfaces. The most widely known solid lubricants in use are molybdenum sulfide ($MoS_2$), graphite and polytetrafluoroethylene (PTFE).

Several companies in Japan have described lubricating paints in which oil was added.

Tadaoki Satoh and Naoko Takano (UDC 667.613.7, 620.191.36) have dissolved small quantities of oil in paints to reduce the superficial tensions and risks of cracking in the dried paint layer. When oil is dissolved in a paint, the paint becomes less brittle when subjected to high loading conditions, or an oscillating-type force.

In Japanese Patent Nos. 53-147737 and 54-112939, oil is added to the top coating of certain paints in order to avoid the adhesion of posters to the surface of the coated object.

Japanese Patent No. 56-84952 refers to a lubricating paint containing from 0.5 to 3.0 weight percent of a lubricant having molecular weight of 3,000 AMU's, the lubricant not being in a liquid state at room temperature.

Japanese Patent No. 53-116,486 refers to an insulated electrical wire having a superficial coating containing from 0.03 to 5.00 weight percent silicon oil which produces a low coefficient of friction, prevents folding and enhances shock resistance.

Japanese Patent No. 56-70880, discloses a double lubricating coating obtained by fusion of resin powder containing mineral, vegetable or animal oils upon the surface of the coated object.

All of the disclosed references suggest that the oil added in the paint is homogenously dissolved in the paint. Therefore, the lubricant does not function as liquid oil when it is homogeneously dissolved into the binder. Hence, efficient lubrication is not achieved resulting in no reduction of wear on the sliding parts.

SUMMARY OF THE INVENTION

The present invention was made in view of the foregoing background, and to overcome the foregoing drawbacks. It is accordingly an object of this invention to provide a lubricating layer consisting of a paint comprising isolated drops of non-dissolved liquid lubricant, providing reduced coefficients of friction and reduced wear of sliding parts. Only the non-dissolved part of the liquid lubricant is effective in reducing friction and wear.

The dissolved part of oil introduced into the binder should not exceed 30% by Volume, preferably 8% by Volume, the remainder of the oil being non-dissolved in the binder. The dissolved portion reduces the mechanical properties of the binder.

To attain the above objects a lubricating paint for sliding parts comprises:

a non-dissolved suspension of a liquid lubricant within a paint, providing lubrication between two contacting surfaces, as the binder material, which suspends the lubricant, wears down from sliding contact between the two surfaces. Hence, some non-dissolved droplets of lubricant spill onto the surface of the binder resulting in a decreased coefficient of friction and increased service expectancy of both sliding parts.

BRIEF DESCRIPTION OF THE DRAWINGS

The above objects, features and advantages of the present invention will become more apparent from reading the following description of the preferred embodiments taken in connection with the accompanying drawings, wherein:

FIG. 10 is a partially schematic view of a pin on disk type friction measuring machine;

DETAILED DESCRIPTION OF THE PREFERRED EMBODIMENTS

Figure 1:
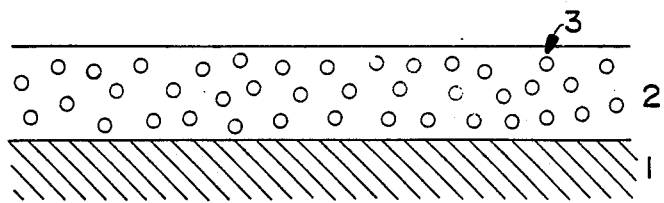
FIG. 1 is a schematic cross-sectional view of a coating of lubricating paint with non-dissolved, suspended oil inclusions, placed upon a substrate.
Figure 2:
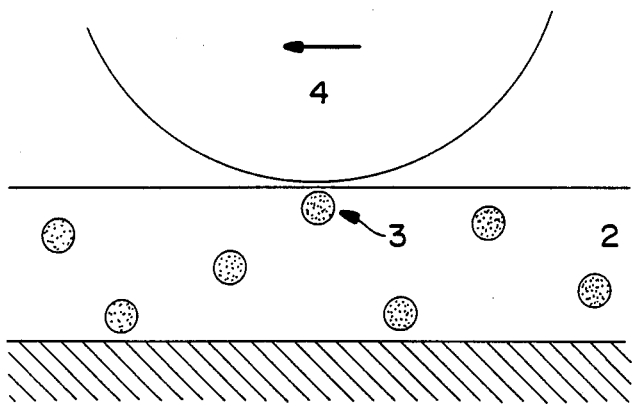
FIG. 2 is a schematic cross-sectional view of a coating of lubricating paint with non-dissolved, suspended liquid lubricant inclusions therein, placed on a substrate, with the lubricating paint in contact with a sliding part.
Figure 3:
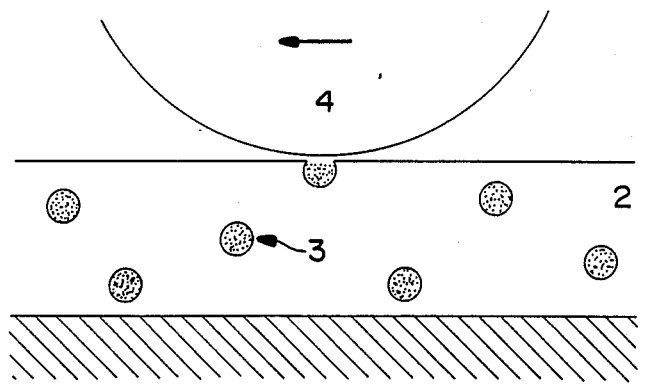
FIG. 3 is a schematic cross-sectional view of a coating of lubricating paint which has been slightly worn on its surface.
Figure 4:
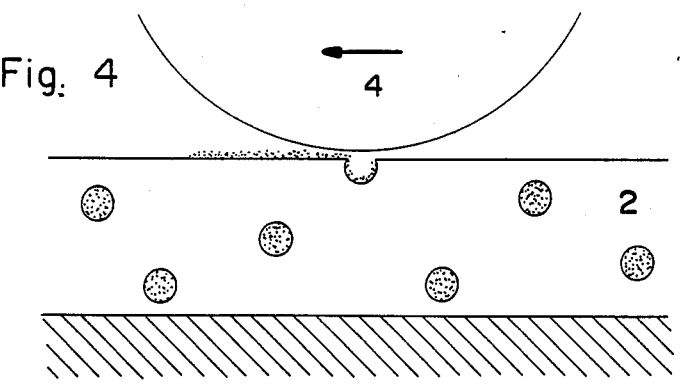
FIG. 4 is a schematic cross-sectional view showing a sliding part rupturing a non-dissolved, suspended liquid lubricant inclusion and spreading the liquid upon the surface of the binder, providing low friction and low wear.

Referring first to FIGS. 1–4, schematic schematic cross-sectional views of a sequential operation are disclosed. FIG. 1 displays a substrate 1 upon which a binder 2 is coated. The binder 2 includes non-dissolved, suspended lubricant droplets 3 therein. FIG. 2 shows an object 4 contacting the surface of the binder 2. The object 4 experiences friction between itself and the surface of the binder 2. When the binder surface does not have any lubricant thereon, a relatively rapid wear rate occurs, resulting in a loss of binder material in the area of contact between the object 4 and the binder 2. FIG. 3 discloses a situation where the object 4 has worn the binder 2 down to one of the lubricant inclusions 3. The object 4 is now in direct contact with the lubricant stored in the inclusion 3, and FIG. 4 shows a subsequent dispersement of the lubricant onto the surface of the binder 2. The oil or liquid lubricant on the surface provides lubrication between the object 4 and the binder surface, thereby reducing the coefficient of friction between the two parts, and decreasing the rate of wear of the binder 2.

If a proper amount of oil or other lubricant is present within the binder then a sufficient amount of oil will always be present upon the surface for providing lubrication between the object 4 and the binder 2. This resuIts in extremely reduced wear in comparison to a lubricating paint which does not utilize lubricant inclusions.

Figure 5:
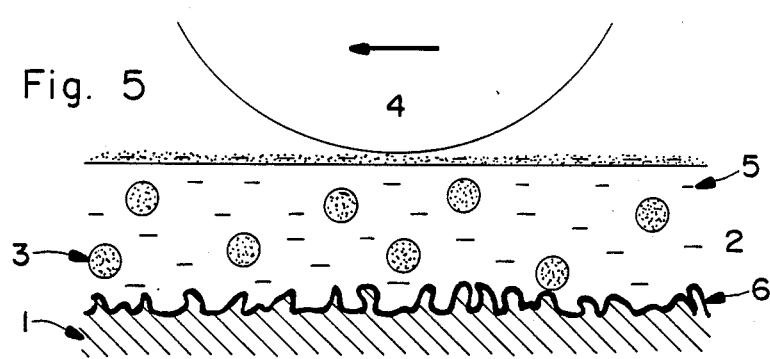
FIG. 5 is a schematic cross-sectional view of a binder attached to an intermediate coating deposited on a roughened substrate, the binder having a non-dissolved, suspension of liquid lubricant(s) and solid lubricant(s) inclusions and the substrate may be roughened by sand blasting, shot blasting or rectification, leaving crooked asperities.

FIG. 5 discloses a suspended solid lubricant 5 within the matrix of a binder 2 and a non-dissolved, suspended liquid lubricant 3 also within matrix. The solid lubricant may be of one composition or of many different compositions such as PTFE, MoS$_2$, graphite, graphite fluoride, WS$_2$ WSe$_2$. However, the solid lubricant is considerably less efficient than liquid lubricant(s). FIG. 5 also shows that the substrate 1 has an intermediate coating 6 on a modified or rough surface which permits a greater adherence of the lubricating paint to the substrate 1.

Figure 6:
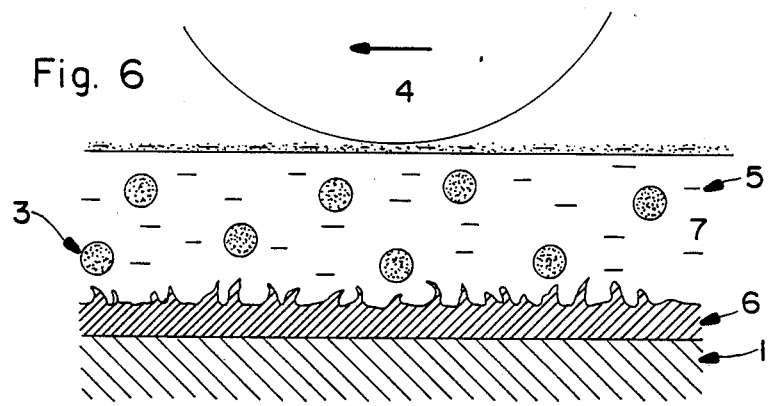
FIG. 6 is a schematic cross-sectional view of a binder attached to a rough intermediate coating deposited on a substrate, the binder having non-dissolved, suspened inclusions of both solid and liquid lubricants.

FIG. 6 shows similar solid lubricants 5 and liquid lubricant(s) 3 included within binder 2, and an intermediate coating 6, such as a primer paint or a rust resistant metal or a phosphate, placed upon the substrate 1, with the intermediate coating providing better adherence of the lubricating paint to the substrate 1.

Figure 7:
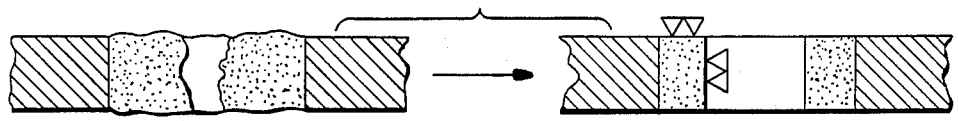
FIG. 7 is a schematic cross-sectional view of a thick coating of a lubricating paint in a bore, showing subsequent machining of the thick lubricating paint, thereby forming a bearing.
Figure 8:
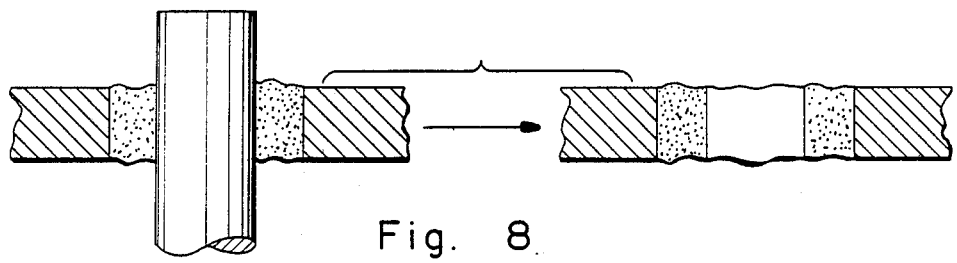
FIG. 8 is a schematic cross-sectional view of a forming process for a thick coating of a lubricating paint in an opening, the lubricating coating being hardened in place, adhering to the hollow part, hollowed by the cylindrical form previously coated with an anti-adhesion product.
Figure 9:
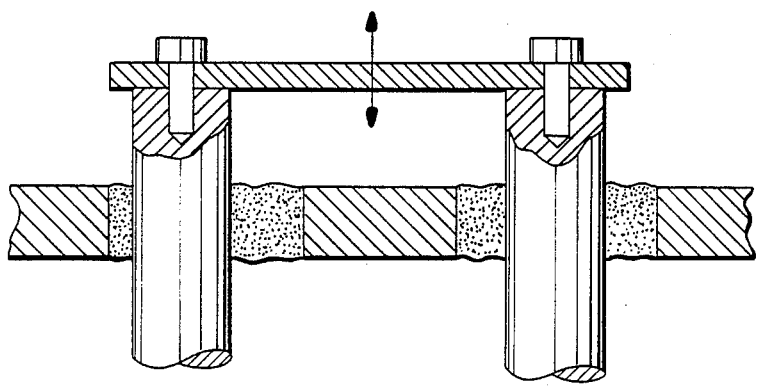
FIG. 9 is a schematic cross-sectional view of a forming process for a thick coating of a lubricating paint in two bores, which together with the process discloses in FIG. 8 provides a precision alignment of the two bores.

Thick coatings of lubricating paints are realizable by using hardenable, two-component binders, such as epoxy and polyurethane resins, which harden without the necessity of exposure to the air. FIGS. 7, 8 and 9 show different methods of using thick lubricating paint coatings.

FIG. 7 shows the application of a thick coating within a hole or opening in a piece and subsequent machining of the coating until a desired shape and size is achieved. FIG. 8 shows a forming part, which was first coated with an anti-adhesion product, positioned within a hole in another piece, upon which a thick coating has been applied. The anti-adhesion coating on the forming piece results in the application of a thick lubricating paint coating adhering only to the support and not to the forming part.

FIG. 9 shows the same method of obtaining accurate dimensions of thick lubricating paint coatings, but applied to two parts. The parts positioned within the lubricating coating paint are designed to operate in the position shown and are therefore not removed while the lubricating paint coating is cast about them and hardened in place. This results in higher precision, thereby eliminating any possible dimensional errors, and since the sliding parts are precoated with an anti-adhesive product, the thick lubricating paint coating will not adhere to their surfaces.

The lubricating paints differ in a unique way from porous bearings which contain a liquid lubricant. Porous bearings are widespread and quite helpful, but because the pores communicate with each other, the oil therein slowly diappears by use and contact with the atmosphere at the peripheral regions of the bearing. Conversely, the lubricating paints do not suffer from such a drawback because the oil is contacted within a binder, and it does not contact the atmosphere when not in use. The only time it comes into contact with the atmosphere is when the binder is worn down by frictional contact with a moving part. The oil is thus kept in a sheltered state until it needs to be used.

This makes lubricating paints useful for mechanisms which must be stored for a long time before use. For example, firearms, switches which are not used for long periods of time, horological mechanisms stocked for long durations of time, etc.

Several types of oil can be used as the included lubricant and the decision of which lubricant to use is a matter of the in solubility of the lubricants in the binder. Mineral, vegetable and animal oils are less favorable for such applications, than synthetic lubricants, such as perfluorinated polyethers, perfluorinated or partially fluorinated hydrocarbons, fluorinated polysiloxanes, alcoyle/aryle-polysiloxanes and polyolefines. Oils on a perfluorinated polyether base are insoluble in at least all non-fluorinated binders, as for example, phenoic resins, epoxy resins, glycerophtalic varnish, alkyde and amine resins and acryloisocyanate resins. A typical example of perfluorinated polyether base oils are perflorinated polyethyloxy polyethers having the formula:

$$CF_3-(O-CF_2-CF_2)_m-(O-CF_2)_n-CF_3 \qquad I.$$

the so-called Fomblin Z oils of Montecatini-Edison (U.S. Pat. No. 3,715,378).

Some other, but less efficient perfluorinated polyethers are perfluorinated polyisopropyloxy polyethers having the formula:

$$CF_3(O-\underset{\underset{CF_3}{|}}{CF}-CF_2)_m-(O-CF_2)_n-O-CF_3 \qquad II.$$

the so-called Fomblin Y oils of Montecatini-Edison (U.S. Pat. No. 3,665,041) or similar oils, such as Krytox (U.S. Pat. No. 3,242,218) and Brayco-oil.

In some binders, such as solvent free epoxy resins, almost all oils are insoluble, as for example, perfluorinated polyethers (e.g. Fomblin Z25 and Y25), polyglycol (a moderately priced synthetic oil), SAE 30 (a mineral oil), ground-nut (a vegetable oil) and OX foot (an animal oil).

The following examples describe different variations in the preparation process of lubricating paints.

One method involves a one compound organic paint, preferably transparent, as for example, glycerophthalic varnishes and alkyde and amine resins, so that the solubility of the oil within the binder can be visually observed. It is necessary to choose oils which do not substantially dissolve within the binder and also maintain a stable emulsion after the mixture has been agitated. After agitation, the mixture is spread onto a desired surface, then dried and cured according to the curing specification of the binder manufacturer.

In order to obtain a harder coating, the immediately aforedescribed procedure is again utilized but with a slight difference, namely that a two component paint, such as epoxy or polyurethane resin, is used. The oil is introduced into the two component mixture. The mixture is then spread onto the surface to be coated, dried and hardened. Similarly, an oil emulsion can be prepared with just one of the two components by dispersing the lubricant within one of the components, by appropriate agitation means, and then introducing the second component into the emulsion. The mixture is then spread onto the piece, dried and cured according to the specifications of the binder manufacturer.

To obtain a lubricating coating paint having a solid lubricant therein, the same procedures as described above can be used. However, the introduction of the solid lubricant, such as PTFE, $MoS_2$ or graphite, graphite fluoride, $WS_2$ and $WSe_2$ can occur either before or after the addition of oil into the binder. The mixture is then spread, dried and cured.

Problems can arise when attempting to obtain an emulsion of an oil droplets within a binder. The oil may agglomerate, thereby forming large drops or the oil may dissolve in the binder. If a transparent binder is being used, either of these two defects can be visually observed. However, if a non-transparent binder is being used, the only way to verify proper inclusion of the oil droplets within the binder is to perform some type of friction test upon the coated piece.

To obtain thin coatings, the binder can be made more fluid. Three different procedures to realize the painting can be used:

(1) A solvent is introduced into the suspension of binder and oil. Before proceeding so, a check must be made to verify that the oil is not soluble in the paint. The solvent can or cannot dissolve the oil.

(2) The oil and the solvent are mixed (if the solvent does not dissolve the oil) and the mixture is introduced into the paint.

(3) The oil is dissolved in the solvent and the liquid thereby obtained is introduced into the binder. In this case, the mechanical shaking of the mixtures does not influence the size of the drops of oil which will take shape in the paint. Their dimensions are a function of the drying speed, the curing procedure and superficial tensions.

The densities of the oil, paint and solvents must be closely matched if the mixtures and emulsions are to remain stable until the binder hardens. Therefore, tensioactive agents, such as naphtalene sulfonate or non-ionic agents, or agents influencing the rheological behavior of the mixture can be used to stabilize such emulsions.

The viscosity of the binder is also important. As the viscosity of the emulsion increases, so does the stability of the emulsion. However, it is difficult to obtain thin coatings with highly viscous binders. Also, a high viscosity binder results in the introduction of more air bubbles during mechanical agitation. Therefore, undesired porosity will be achieved in the binder. The bubbles are unfavorable because they introduce irregularities in the binder which result in fatigue effects in the binder. One method of removing the included bubbles is to perform the drying and curing after outgassing in a partial vacuum (0.1 to 0.8 bar).

The paints can be applied by various methods. They can be spread on flat surfaces with a paint brush or a roller, parts can be immersed in the lubricating paint, they can be applied by atomization with a spray gun, or by atomization of a specially prepared spray within a spray can having insoluble oil, for example, Fomblin Z 25 or Y 25 Oil, introduced therein, which must be vigorously shaken before use. The lubricating paints can be applied either on the totality of a surface or only on partial portions of a surface. Care must be taken to insure that the surface is clean before attempting to adhere a lubricating paint to it. However, the adhesion of the mixture to the surface is not significantly affected by the presence of the included oil.

Thick coatings of the lubricating paint can be realized by the aforementioned procedure discussed in connection with FIGS. 7, 8 and 9.

The form and dimension of the liquid lubricant inclusions depend on the type of binder, the type of liquid lubricant and the thickness and manufacturing method of the paint. In thick coatings of up to 10 millimeters or more, the form of the liquid lubricant inclusions is typically spherical with a diameter of 0.1 to 1000 micrometers. In thin coatings of up to approximately 10 micrometers, the form of the liquid lubricant inclusions is typically thin and disk-like, with a diameter of 0.1 to 1000 micrometers and a thickness of 1 to 5 micrometers.

The amount of liquid lubricant in the paint is typically 0.1 to 45 Volume percent according to the type of binder, the type of liquid lubricant and the foreseen use.

The lubricating paints can be easily tested by one of a two different devices: a pin on disk-type friction machine or a Microtribometer. The pin on disk-type friction machine is a universal apparatus known by most who test self-lubricating materials or those who study dry friction. The apparatus consists of a rotating disk, which is in contact with a steel ball, which is pressed toward the surface of the rotating disk with a predetermined force. During the test, the coefficient of friction is measured as a function of time. At the end of the test, the rate of wear of the coating is calculated by examining the profile of the worn surfaces by some type of Profileometer. A pin on disk-type friction machine is shown in FIG. 10.

Figure 11:
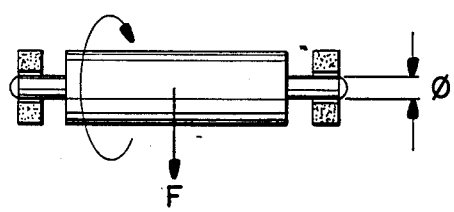
FIG. 11 is a partially schematic view of a friction testing device known as a Microtriobometer.

Tests conducted with a Microtribometer are performed on a micromechanical scale using an apparatus of axial-bearing geometry as shown in FIG. 11. This results in the ability to measure the coefficient of friction as a function of rotating speed.

To examine the true utility of a lubricating paint, one must put it into actual service. However, only qualitative results would be possible from such experimentation, for example only results pertaining to favorable versus nonfavorable duration or performance as opposed to quantitative results which are obtained by some type of friction machine.

The following examples illustrate the present invention and are presented without inferring any specific limitations. The following examples are results of use of a pin on disk-type friction machine having a 0.1 meter per second sliding speed, a 5.0 Newton contact force between the steel (100Cr6/AISI 52100) 6 millimeter diameter ball and a steel disk coated with various lubricating paints.

EXAMPLE 1

A commercial dry lubricating paint, known as Emralon 330, phenolic resin binder with PTFE solid lubricant, manufactured by Acheson Colloids Company, Michigan, was tested for coefficient of friction and rate of wear with and without lubricating oil incorporated therein. One favorable oil that dispersed within the Emralon 330 is known as KF oil (perfluorinated hydrocarbons) manfactured by the 3M Company (Minnesota Mining and Manufacturing). The oil was introduced in an amount equivalent to 10 weight percent into the Emralon 330. The mixture was mechanically agitated in a small container before being spread, dried and cured for one hour at 150° C.

TABLE 1

| Coating | Coefficient of friction | Rate of wear of the coating in $10^{-15}$ m$^2$/N |
| --- | --- | --- |
| Emralon 330 | 0.11–0.13 | 1700 |
| Emralon 330 + 10% oil KF from 3M | 0.10–0.12 | 41 |

The inclusion of oil produced unexpectedly favorable results. While the coefficient of friction was not significantly reduced, the rate of wear of the coating was reduced by a factor of approximately 40.

EXAMPLE 2

Various combinations of paint and oil mixtures have been tested and are disclosed in Table 2. Oils which have given favorable results when combined with different paints have been indicated. In all favorable cases, the coefficients of friction were reduced. All paints were prepared in proportions prescribed by the supplier and by introducing 10 weight percent oil in the mixture and then manually agitating the solution in a small container, with the mixture subsequently dryed and cured according to the binder supplier specifications. The last entry in each of the columns under the four different paints indicates the wear rate of the paint without oil inclusions therein, while the chart when read horizontally and vertically indicates the wear rates of the paints with oil inclusions.

TABLE 2

Wear rate of different paintings with oil inclusions or without oil, in $10^{-15}$ m$^2$/N

| | Composition | | Epoxy resin | glycero-phtalic varnish | Alkyde & Amine resin | Acryloiso-cyanate resin* |
| --- | --- | --- | --- | --- | --- | --- |
| Painting | Commerical example | | Etokat | Stellal | E E | Bilacryl |
| Oil | Supplier in Switzer. | | W. Mader SA | F. Zuger SA | Landolt | Landolt |
| | Color | | Transparent | Transparent | Transparent | White |
| | Components | 1 | | X | X | |
| | | 2 (proportions) | 1/1 | | | 5/1 |
| | Curing | Minutes | 10 | 30 | 60 | 60 |
| | | Temp. °C. | 120 | 130 | 120 | 70 |
| Fomblin Y 25** | | | 4 | 70 | 35 | ▨ |
| Fomblin Z 25*** | | | example 3 | 16 | 19 | 2 |
| Fluorosilicone FS 1265 +(Dow Chemicals) | | | 0.8 | ▨ | 14 | 3.7 |
| 47 V 100 Silicone++ | | | 0.4 | 95 | ▨ | 6.1 |
| Silicone 308 V 100 (Rhone Poulenc)+++ | | | 3.6 | ▨ | ▨ | ▨ |
| Without Oil | | | 1620 | 465 | 519 | 58 |

*polyurethane
+fluoropolysiloxane
**perfluorinated polyisopropyloxypolyether (Montecanti-Edison)
++dimethylpolysiloxane
***perfluorinated polyethyloxypolyether (Montecanti-Edison)
+++methylalcoylpolysiloxane ▨ dissolved oil or unstable mixture The two component paint using Etokat as the binder and the oil Fomblin Z 25 as the lubricant, was manually shaken and spread on a disk and cured. This mixture was tested to determine an optimum oil inclusion amount. The results of varying the percentage of oil included in the paint are shown in FIGS. 12 and 13.

Figure 12:
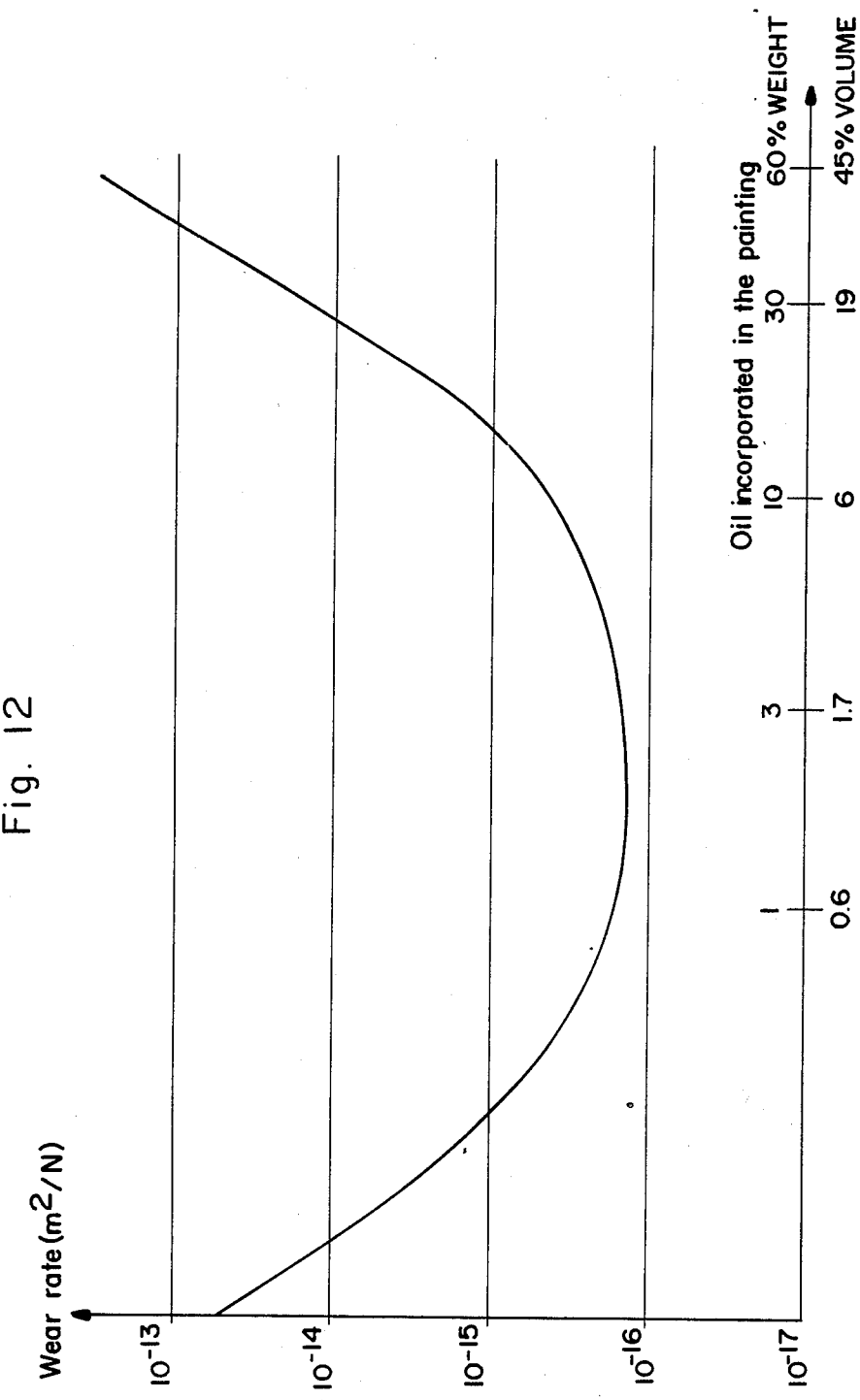
FIG. 12 is a plot of the measured wear rate of a lubricating paint versus the amount of oil incorporated in the paint.

FIG. 12 shows a plot of wear rate versus the amount, in both weight percent and volume percent, of oil incorporated in the paint. In this instance, it appears that only about 0.5 volume percent of oil needs to be included within the paint to obtain a substantially low wear rate, while a minimum appears to exist at approximately 1.5 volume percent oil. At greater than 1.5 volume percent oil, the wear rate increases because of the decrease in the mechanical resistance of the paint. At approximately 10 volume percent oil and above, the paint loses much oil and a hydrodynamic situation exists.

Figure 13:
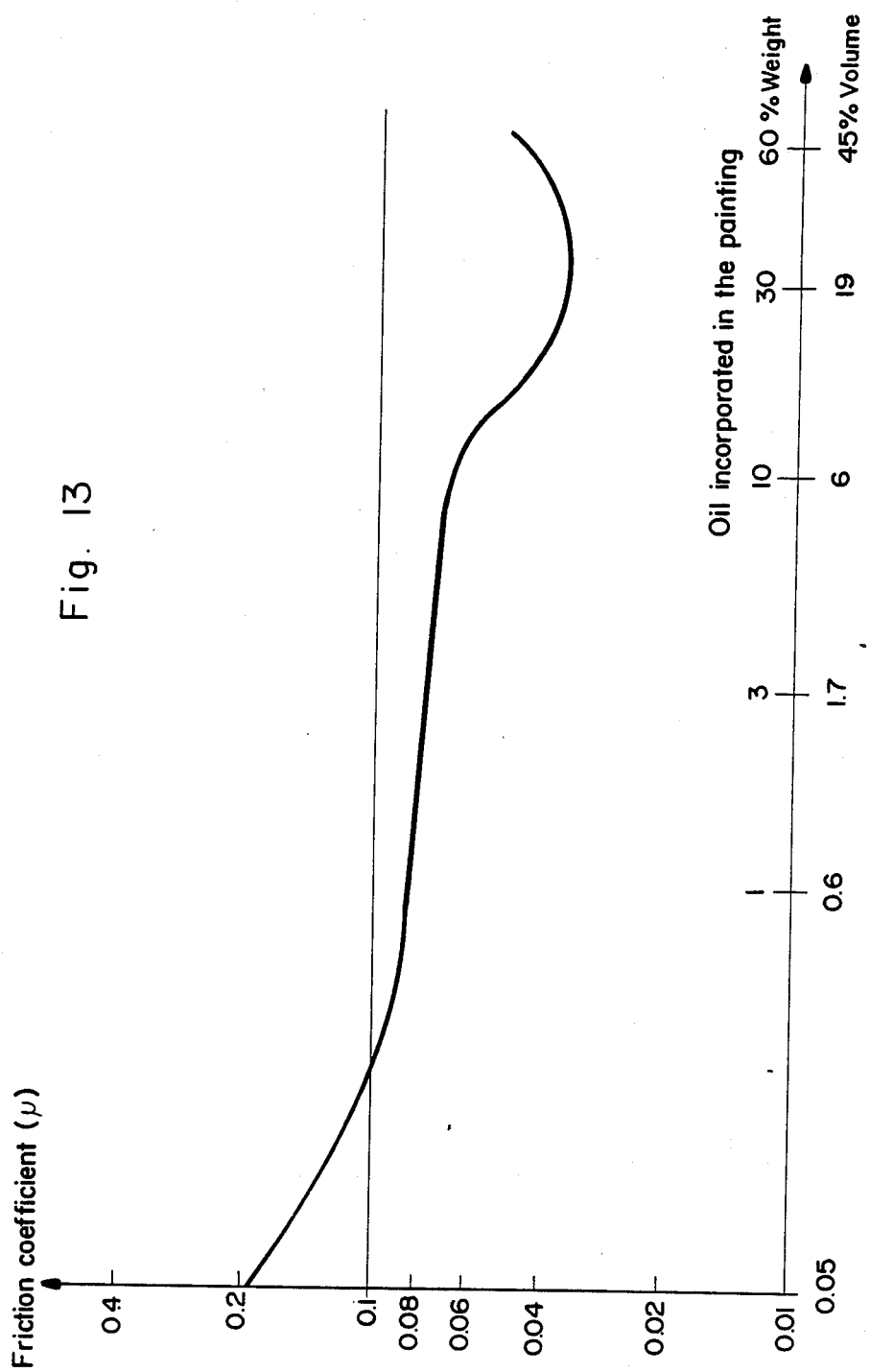
FIG. 13 is a plot of the measured friction coefficient of a lubricating paint versus the amount of oil incorporated in the paint.

FIG. 13 is a plot showing the friction coefficient versus the amount of oil, in both volume and weight percent, incorporated into the paint. FIG. 13 shows that the friction decreases by increasing the amount of oil incorporated in the paint. However, an acceptably low coefficient of friction is present at the corresponding minimum wear rate. Therefore, when viewing FIGS. 12 and 13 together, it becomes apparent that a very significantly reduced wear rate (reduction by a factor of 100) can be achieved at about the same oil content that yields an acceptably low friction coefficient. That being the range of about 0.5 to 1.5 volume percent of oil incorporated in the binder. However, the optimum concentration of oil depends upon the desired use for the coated piece.

In cases where a significant amount of oil is required or where the friction creating contact surface is frequently changing, or the oil is easily eliminated, a paint having a high percentage of oil included within the binder should be chosen. In other instances where there the contacted surfaces are within a clean environment and the contacting friction surfaces are always identical and of minimal roughness, a paint having somewhere between 1.5 and 3.0 volume percent of oil should be chosen so that better mechanical resistance will be obtained. The potential proportions of oil which are useable cover a wide scope of volume percentages, which must be chosen to meet the individual circumstances.

The small drops of oil within the binder having, for example, approximately 0.5 weight percent of oil included therein, had a diameter ranging between about 2 and 17 $\mu$m.

EXAMPLE 3

The paints used can be reduced in viscosity by two different methods. A solvent can be introduced into the binder and oil emulsion, or the oil can first be diluted by the diluent and then both introduced into the binder.

The paint and oil used in Example 3 have been diluted in three different ways and the results are given in Table 3.

TABLE 3

| Fluidified paints [binder (2 components) + solvent + oil] + solvent | | | | Rate of wear in $10^{-15}$ m²/N |
|---|---|---|---|---|
| Etokat type | without | Fomblin Z 25 | +40% special Epoxy (solvent containing butyl- | 9.3 |

TABLE 3-continued

| Fluidified paints [binder (2 components) + solvent + oil] + solvent | | | | Rate of wear in $10^{-15}$ m²/N |
|---|---|---|---|---|
| Epoxy | Trifluorotrichlorethane 40% by weight | 4% of the final paint | glycol ethylglycoltoluene without | 0.3 |
| | without | | Trifluorotrichlorethane (40% by weight) | 0.24 |

It is apparent that the wear rate varies depending upon the dilution method used.

The Fomblin Z 25 oil is not soluble in the binder, alone but it is soluble in the trifluorotrichlorethane which also dissolves the binder. The special "epoxy diluent" dissolves the binder, but not the oil.

EXAMPLE 4

Fomblin Z 25 oil was introduced in a commercial acrylic spray-can into a transparent paint used to repair scratches in the paint of automobiles. After vigorously shaking the container, samples were covered with this paint and the coating did not show high mechanical qualities but did have unexpectedly advantageous friction results as shown in Table 4.

TABLE 4

| Number of Coatings | Medium coefficient of friction | Duration till perforation of the coating |
|---|---|---|
| 1 coating | 0.04 | 1,400 rotations |
| 3 coatings | 0.13 | 70,000 rotations |

Table 4 shows that as the number of coatings increases the life-time also increases.

EXAMPLE 5

An Etokat paint (epoxy resin of Example 2) with 3 volume % of oil (Fomblin Z 25 of Example 2) included therein was applied with a paint brush on brown PVC adhesive tape. The tape was then stuck on a brass disk and tested for friction on a ball-disk testing machine, which yielded the results shown in Table 5.

TABLE 5

| Species Subjected to Friction Test | Median coefficient of friction | Duration before perforation (rotations) |
|---|---|---|
| Normal adhesive tape | 0.33 | 69,000 |
| Band with Etokat epoxy paint with 3% oil | 0.05 | 300,000 |

The tape having no lubricating paint showed the coefficient roughly six times higher than the tape with 3 volume percent oil included therein and a life-time equivalent to 25 percent of the life-time of the paint with the 3 volume percent oil included therein.

EXAMPLE 6

Figure 14:
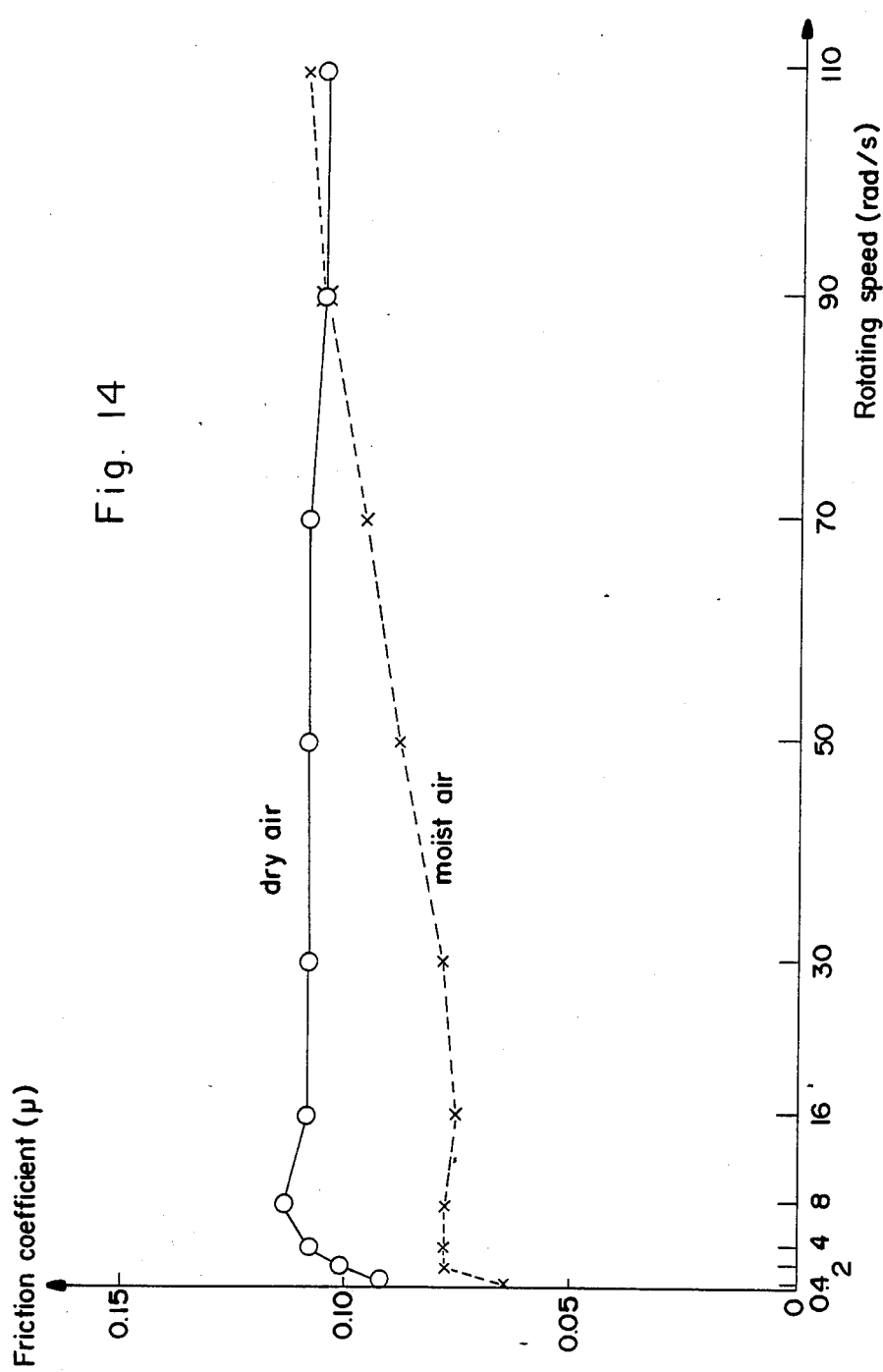
FIG. 14 is a plot of the coefficient of friction versus the rotating speed of the Microtriobometer measured in two different atmosphere.

A binder comprised of A Y 103 Araldite (epoxy resin "Bisphenol A" 'Epichlorohydrin' of Ciba-Geigy) was used with harderner 951 HY 951 (Tryethylenetetramine of Ciba-Geigy) to form a binder for a thick coating of a lubricating paint having 5 volume percent of Fomblin Z 25 oil incorporated therein. A Microtribometer was used to measure the coefficient of friction in 0.1 mm diameter bearings which were formed by the method shown in FIG. 7. The results of the Microtribometer test are shown in FIG. 14, which is a plot of the friction coefficient versus the rotating speed of the Microtribometer, in dry and humid air.

EXAMPLE 7

In a solvent free 2 component epoxy binder used for building paints, without the mineral adjunction, different oils were introduced in 10% weight quantity. An emulsion was formed and applied to steel discs. After normal air curing, the coated discs were tested on a pin on disc machine. The results obtained were:

| Oil | Friction coefficient | Coating wear rate in $10^{-15}$ m$^2$/N |
|---|---|---|
| expensive synthetic perfluorated polyether (Fomblin Oil Z 25) | 0.07 | 0.14 |
| moderate price synthetic (polyglycol) | 0.08 | 1.1 |
| mineral (SAE 30 motor oil) | 0.18 | 10 |
| vegetable (ground-nut) | 0.06 | 6.1 |
| animal (ox foot) | 0.07 | 7.0 |
| no oil | 0.53 | 97.0 |

Compared to the normal binder, the mineral oil reduces the wear by a factor of 10; another order of magnitude in wear reduction occur with the synthetic oil. With high performance synthetic oil, wear is three orders of magitude lower.

EXAMPLE 8

In a solid lubricant spray (Molykote 321 R), a perfluorated polyether oil (Fomblin Z 03) was introduced (1.5% Vol. % in spray can, which gives 30% weight of oil in the dry films). The solid film lubricant has a non-organic binder and non-metallic binder, containing MoS$_2$, and as a solvent a fluorated hydrocarbon. The sprayed coatings on steel discs, tested on a pin on disc machine, in humid air, show the following life-times (revolutions up to a friction coefficient of 0.3):

| Normal spray | 5,800 revolutions |
|---|---|
| spray with oil inclusions | 234,000 revolutions |

The life-time increased by a factor 40.

EXAMPLE 9

A perfluorated polyether oil (Fomblin Z 03), was introduced (2% by weight in liquid, giving 30% weight of oil in the dry form) into a solid film lubricant (Tiolon E 20). The solid film lubricant has a thermosetting resin and contains PTFE-poweder.

The coating obtained by painting steel discs, cured for 1 hour at 200° C., was tested on a pin on disc testing machine, in humid air. The life-time obtained (revolutions up to friction coefficient of 0.3) were as follows:

| Normal solid film | 6,200 revolutions |
|---|---|
| solid film with oil inclusions | 813,000 revolutions |

The life-time increased by a factor of 131.

What is claimed is:

1. A non-aqueous composition for preparing self-lubricating coatings, comprising:
   (a) a non-thermomolding solidifiable binder; and
   (b) a liquid lubricant selected from the group of slightly soluble oils consisting of synthetic oils, mineral oils, vegetable oils, animal oils and any mixture thereof, said liquid lubricant not being previously encapsulated and being included in an amount greater than 6 vol. %, but less than or equal to 45 Vol. %, least partially non-dissolved in the solidifiable binder after the binder has been solidified, thereby forming a non-metallic, non-magnetic coating which is self-lubricating both on and below its surface, said coating containing inclusions of said liquid lubricant as droplets dispersed throughout, thereby achieving a low sliding friction upon the initiation of wearing on said binder.

2. A non-aqueous composition for preparing self-lubricating coatings, comprising:
   (a) a non-thermomolding solidifiable binder; and
   (b) a substantially insoluble synthetic liquid lubricant, said liquid lubricant not being previously encapsulated and being included in an amount of at least 0.1 vol. % but less than or equal to 45 vol. % so as to remain non-dissolved in the solidifiable binder after the binder has been solidified, thereby forming a non-metallic, non-magnetic coating which is self-lubricating both on and below its surface, said coating containing inclusions of said liquid lubricant as droplets dispersed throughout, thereby achieving a low sliding friction upon the initiation of wearing on said binder.

3. A non-aqueous composition according to claim 2, wherein the solidifiable binder is an epoxy resin having a low amount of solvent therein.

4. A non-aqueous composition according to claim 2, wherein at least one solid lubricant is included in the composition resulting in inclusions of liquid lubricant and other inclusions of solid lubricant in the composition, said inclusions being dispersed throughout said solifidable binder.

5. A non-aqeous composition according to claim 1, wherein the solidifiable binder is an epoxy resin having a low amount of solvent therein.

6. A non-aqueous composition according to claim 1, wherein at least one solid lubricant is included in the composition resulting in inclusions of liquid lubricant and other inclusions of solid lubricant in the composition, said inclusions being dispersed throughout said solidified binder.

* * * * *

UNITED STATES PATENT AND TRADEMARK OFFICE
CERTIFICATE OF CORRECTION

PATENT NO. : 4,937,010

DATED : June 26, 1990

INVENTOR(S) : Michel MAILLAT

It is certified that error appears in the above-identified patent and that said Letters Patent is hereby corrected as shown below:

Column 3, line 39, delete "schematic" (second occurrence).

Column 4, line 47, change "diappears" to --disapears--;

line 50, change "contacted" to --contained--.

Column 7, line 13, change "Profileometer" to --Profilometer--.

Signed and Sealed this

Eighteenth Day of February, 1992

Attest:

HARRY F. MANBECK, JR.

Attesting Officer      Commissioner of Patents and Trademarks